June 2, 1931.  M. J. POSTER  1,807,752
AUTOMOBILE TIRE INDICATOR OR GAUGE
Filed April 8, 1930  2 Sheets-Sheet 1
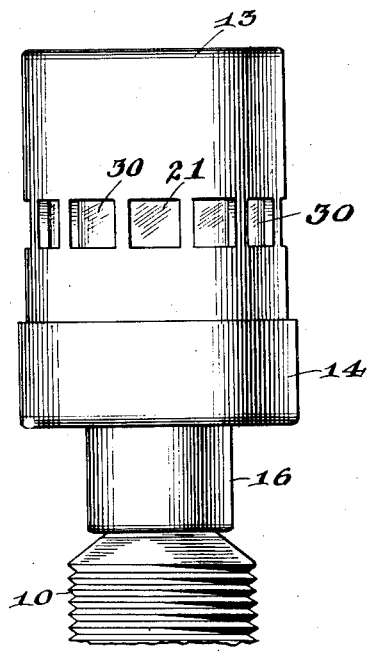
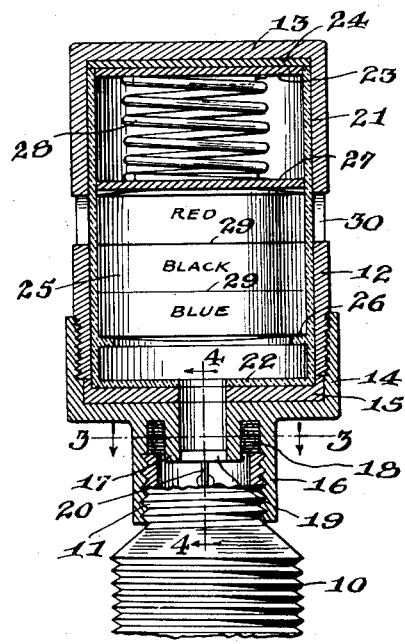
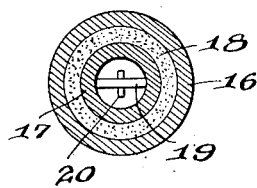
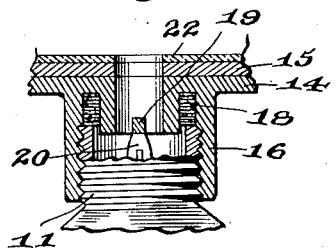
Inventor
Meyer J. Poster,
By Mawhinney & Mawhinney,
Attorneys

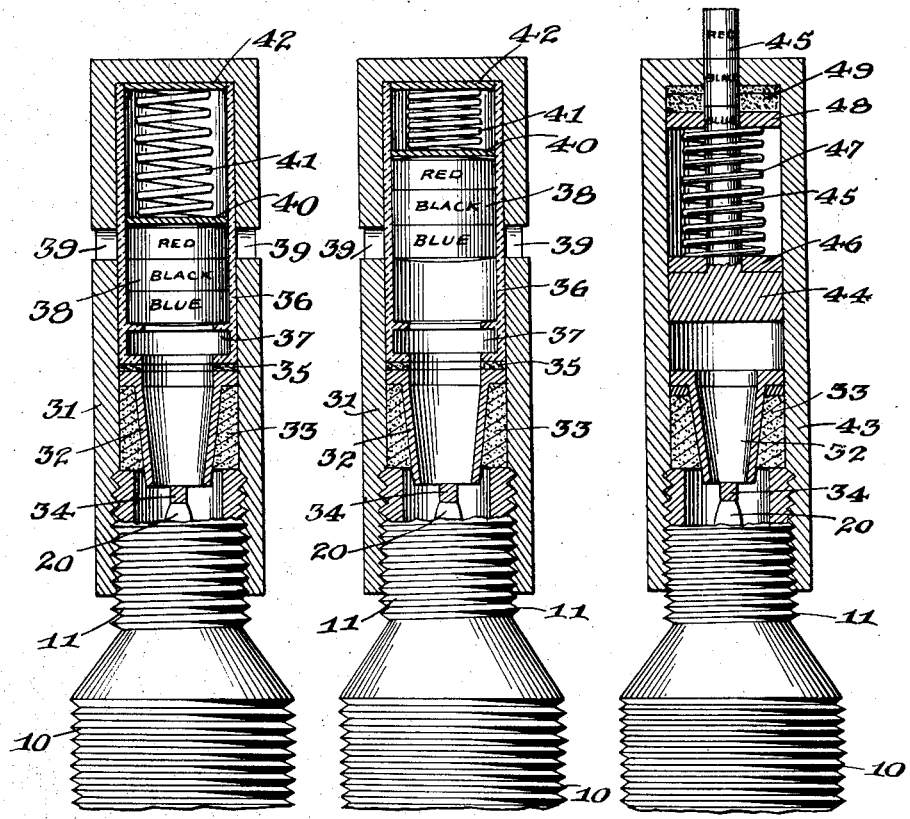

Patented June 2, 1931

1,807,752

UNITED STATES PATENT OFFICE

MEYER J. POSTER, OF NEW YORK, N. Y.

AUTOMOBILE TIRE INDICATOR OR GAUGE

Application filed April 8, 1930. Serial No. 442,672.

The present invention relates to tire pressure gauges or indicators, and an object of the present invention is to provide a device for indicating the relative high, low and normal pressure of a tire.

Another object of the present invention is to provide an indicator of this character which is in the nature of an attachment adapted to be placed quickly and easily upon the stem of a tire valve in lieu of the cap usually carried thereon, and to remain upon the valve stem as a fixture thereon so that the operator of a motor vehicle may at a glance determine the condition of air pressure in the tires.

Another object of the present invention is to provide an attachment adapted to be carried at all times upon the valve stem and it is so constructed that it will show by a color arrangement, or the like, the condition of the tires without resorting to reading tire pressures as the latter are at times not understood and render the reading of the air pressure in the tires difficult and frequently result in error.

A still further object of the invention is to provide an attachment which may be economically manufactured and sold as a separate article, and which may be readily placed by any one upon the valve stem of a tire by merely screwing the device on the valve stem to take the place of the cap.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a side elevation of an automobile tire pressure indicator constructed according to the present invention and as applied to the upper end of a valve stem.

Figure 2 is a longitudinal section taken through the same, part of the valve stem being broken away to show the valve pin.

Figure 3 is a transverse section taken through the inner end of the indicator substantially on the line 3—3 of Figure 2.

Figure 4 is a fragmentary longitudinal section taken through the inner end of the indicator as applied to the valve stem, the section being taken at right angles to the showing in Figure 2 and substantially on the line 4—4 thereof.

Figure 5 is a longitudinal section taken through a slightly modified form of the indicator as applied to the valve stem, the parts being shown in position of under inflation of the tire.

Figure 6 is a similar view to Figure 5 showing the parts in position upon the over inflation of the tire, and Figure 7 is a longitudinal sectional view through a further modified form of the indicator, the same being shown in under inflated position.

Referring now to the drawings, and first to the form of the invention shown in Figures 1 to 4 inclusive, 10 designates the usual valve stem which is reduced and threaded at its upper end to provide a nipple 11 which normally carries the usual closure cap, not shown.

The indicator comprises a body part or casing 12 cylindrical in form and provided with a closed outer end 13 which may comprise an integral portion of the casing 12. The inner end of the casing 12 is externally threaded for engagement in a base portion or cup 14 having a packing washer 15 in its lower end and upon which the lower end of the casing 12 is adapted to seat.

The base portion 14 is provided at its under side with a depending internally threaded sleeve 16 adapted for detachable engagement over the nipple 11 of the valve stem for holding the indicator thereto. The base portion 14 is provided with a central axial opening extending therethrough, and the packing washer 15 is provided with a registering opening to intercommunicate the interior of the casing 12 with the interior of the valve stem 10.

Within the sleeve 16 is disposed an annular shoulder or wall 17 spaced from the sleeve 16 and depending about the marginal axial opening in the base portion 14 to provide an annular channel or recess between the wall 17 and the sleeve 16 for housing a packing or gasket adapted to be compressed against the upper end of the nipple 11 for sealing the base portion upon the valve stem. The upper end of the base portion 14 is threaded to engage with a similar thread of the lower casing 12. The lower end of the wall 17 is provided with a transverse bar 19 adapted to register with the upper end of the valve pin 20 for depressing the same as the base portion is screwed upon the valve stem so as to open the valve and admit air from the tire to the inner end of the casing 12.

Within the casing 12 is fitted a transparent cylinder 21 of glass or the like which preferably has a closed bottom 22 suitably apertured to register with the opening through the base portion 14 but which is open at its upper end for the introduction of certain parts hereinafter described. The upper end of the cylinder 21 houses a disc 23 which may fit in the upper end of the cylinder 21 and bears against a packing 24 disposed between the upper end of the cylinder 21 and the outer end 13 of the casing 12.

A piston 25 is mounted for movement lengthwise in the cylinder 21 and when moved inwardly to its fullest extent is adapted to rest upon a shoulder 26 projecting inwardly from the cylinder 21 in spaced relation to its closed bottom or inner end 22 to provide at all times an air receiving chamber in the inner end of the cylinder. Bearing against the outer end of the piston 25 is a disc or washer 27 urged against the piston 25 by a spring 28 disposed in the outer end of the cylinder 21 and bearing at its outer end against the disc 23. The discs 23 and 27 have the opposite ends of the spring 28 fastened thereto to keep the spring 28 in place and insure its proper operation. The piston 25 is normally urged inwardly toward the seat or shoulder 26 by the spring 28.

The piston 25 has its peripheral portion divided lengthwise into sections by lines 29 of demarcation and which may be disposed upon the exterior of the piston in any suitable manner, and the various sections of the piston may be contra-distinguished from one another by coloring the same, such as indicated in Figure 2 by having the upper section red, the intermediate section black, and the inner section blue.

At a suitable point between the ends of the casing 12, the latter is provided with one or more sight openings 30 through which, and the transparent wall of the cylinder 21, may be observed the piston 25 to ascertain the position of the piston 25 in the cylinder.

The spring 28 may be varied in size or resistance according to the size of the tire to which the indicator is to be applied so that the piston 25 may be moved proportionately to the increase or decrease of air pressure in the tire, and so that the indication given by the device will be true for the particular size of tire to which it is applied.

In use, it is only necessary to remove the usual valve cap and screw the base portion 14 on the valve stem as shown in Figures 1, 2 and 4. In positioning the indicator on the valve stem the bar 19 engages the pin 20, depresses it and opens the tire valve so as to establish communication between the interior of the tire and the inner end of the cylinder 21. If, as shown in Figure 2, the tire is under inflated the pressure of the air from the tire will not be sufficient to move the piston 25 outwardly against the tension of the spring 28, and therefore the outer section, indicated as red in the present instance, is presented to view through the sight openings 30 and warns the operator that the tires do not contain sufficient pressure according to the standards set by the manufacturer for insuring the long life of the tire, the proper tractive effort of the tire or the proper riding qualities which should be obtained by use of the particular tire.

If the pressure of the tire is normal, the air will move the piston 25 outwardly against the tension of the spring 28 a distance sufficient to bring the intermediate section into register with the sight opening 30, and thus the indicator will show this proper condition of the air pressure.

Should the tire be over inflated, the piston 25 will be moved outwardly so as to move the inner section of the piston 25 outwardly a distance sufficient to bring the inner section opposite the sight opening 30. The sight opening 30 may comprise a circular row of apertures extending entirely about the casing 12 so that the indicator may be read from any side thereof.

In the modification shown in Figures 5 and 6, the casing 31 of the indicator is closed at its outer end and is internally threaded at its inner end for direct engagement upon the nipple 11 of the valve stem. A downwardly tapering wall or gland 32 is mounted in the casing 31 in spaced relation to its inner end and provides an annular recess for a packing 33 adapted to be compressed against the outer end of the nipple 11 to seal the casing 31 thereon.

The wall 32 carries the transverse bar 34 across its lower end adapted to engage the valve pin 20 as in the form shown in Figure 2. Above the base of the wall 32 is a packing washer 35 upon which is seated the lower open end of a transparent cylinder 36. The cylinder 36 is provided with a shoulder or flange 37 extending inwardly from the cylinder and adapted to engage the inner end of a piston 38 when in its innermost position.

Like the piston 25 in Figure 2, the piston 38 has its outer surface divided into sections adapted to be viewed through a sight opening 39 extending through the wall of the casing 31 intermediate the ends of the casing. A washer 40 rests against the outer end of the piston 38 and supports a spring 41 which bears at its outer end against a disc 42 seated in the outer closed end of the casing 31.

The operation of this modified form of indicator is similar to the operation of the indicator shown in Figures 1 to 4, and Figure 6 shows the position of the piston 38 when moved to its outermost position to show that the tire is over inflated.

Referring now to the modified form shown in Figure 7, the structure is somewhat similar to that shown in Figures 5 and 6 with the exception that the transparent cylinder 36 is not used, and the casing 43 has no sight openings therein.

A plunger or piston 44 is mounted in the casing 43 beyond the annular wall 32 and carries a stem or rod 45 extending outwardly from the piston 44 through the outer end of the casing 43. The outer end portion of the stem 45 is divided into sections similar to the pistons 25 and 38 but the stem 45 by projecting to a more or less extent from the outer end of the casing 43 brings into view the various sections so as to determine the general condition of the air pressure in the tire.

The piston 44 carries a disc or washer 46 upon its upper side about the stem 45 for receiving the inner end of a coil spring 47 surrounding the stem 45. The outer end of the spring 47 engages a plate 48 which bears against a packing 49 disposed in the outer end of the casing 43 for compressing the packing 49 about the stem 45 and sealing the outer end of the casing.

It is obvious that various changes and modifications may be made in the details of construction and design of the above specifically described embodiments of this invention without departing from the spirit thereof, such changes and modifications being restricted only by the scope of the following claims;

What is claimed is:—

1. An automobile tire pressure gauge or indicator, comprising a casing closed at its outer end and having sight openings intermediate its ends, a base portion connected to the inner end of the casing, said base portion having an inwardly extending threaded part adapted to detachably engage with a valve stem, said base portion having an opening therethrough registering with the valve stem and having a bar adapted to engage the pin of the valve for maintaining the same open when the base portion is in position, a transparent cylinder mounted in the casing and having an opening through its inner end to receive air from the base portion, a piston slidably mounted in the transparent cylinder and having surface portions of different colors adapted to register past the sight openings during the movement of the piston, and a spring carried in the outer end of the cylinder for engaging against the outer end of the piston to urge the latter inwardly against the air pressure.

2. An automobile tire pressure gauge or indicator, comprising a casing having an integral outer end closing wall and a threaded inner end and having sight openings in its sides, a glass cylinder fitting in the casing against the closed outer end thereof, removable closing means for the inner end of the casing for maintaining the cylinder in place, said cylinder and closing means having openings therethrough for communication with a tire valve and the closing means having a valve stem depressing bar for opening a tire valve when the device is applied thereto, a piston mounted in the cylinder and having indicator markings thereon, and a spring housed in the outer end of the cylinder and bearing against the piston to normally urge the same inwardly against the air pressure in the tire.

3. An automobile tire pressure gauge or indicator, comprising a casing closed at its outer end, a transparent cylinder mounted in the casing, means for closing the inner end of the casing and securing the inner end of the casing to a tire valve stem, the inner end of said casing and cylinder having openings therethrough intercommunicating the valve stem with the inner end of the cylinder, said casing having lateral sight openings therein for viewing the interior of the cylinder, a piston slidably mounted in the transparent cylinder, a spring in the outer end of the cylinder arranged to normally urge the piston toward the inner end of the cylinder, said piston having red, black and blue surface portions adapted to register consecutively with said sight openings during the outward sliding of the piston under the influence of the air pressure to respectively designate under normal and over inflation of a tire.

In testimony whereof I affix my signature.

MEYER J. POSTER.